United States Patent
Sylvester et al.

(10) Patent No.: US 7,593,933 B2
(45) Date of Patent: Sep. 22, 2009

(54) METHOD AND APPARATUS FOR A COLLABORATIVE INTERACTION NETWORK

(75) Inventors: Mark Sylvester, Carpinteria, CA (US); Kymberlee Weil, Carpinteria, CA (US); Beau Ambur, San Francisco, CA (US)

(73) Assignee: Mixed Grill, L.L.C., Montecito, CA (US)

( * ) Notice: Subject to any disclaimer, the term of this patent is extended or adjusted under 35 U.S.C. 154(b) by 521 days.

(21) Appl. No.: 10/783,616

(22) Filed: Feb. 20, 2004

(65) Prior Publication Data

US 2005/0187956 A1    Aug. 25, 2005

(51) Int. Cl.
     *G06F 17/00*    (2006.01)
(52) U.S. Cl. ........................ 707/5; 707/104.1; 707/101; 709/218
(58) Field of Classification Search ........................ None
See application file for complete search history.

(56) References Cited

U.S. PATENT DOCUMENTS

| | | | |
|---|---|---|---|
| 5,592,375 A | 1/1997 | Salamon et al. | |
| 5,996,006 A * | 11/1999 | Speicher | 709/218 |
| 6,629,097 B1 * | 9/2003 | Keith | 707/5 |
| 2002/0049847 A1 * | 4/2002 | McArdle et al. | 709/227 |
| 2003/0093458 A1 * | 5/2003 | Poindexter et al. | 709/201 |
| 2005/0159970 A1 * | 7/2005 | Buyukkokten et al. | 705/1 |

* cited by examiner

*Primary Examiner*—Charles Rones
*Assistant Examiner*—Belix M Ortiz
(74) *Attorney, Agent, or Firm*—Felix L. Fischer

(57) ABSTRACT

A collaborative interaction network system incorporates screens for entering login data and basic user profile data and, subsequent to successful login, screens for receiving user characteristics data including text entry of user created data and proportional selection of data elements predetermined by the system. A calculation engine then determines a universe of profile and characteristics data for all users based on similarity to the profile and characteristics data of a particular user. A visualizer is provided for displaying a representation of the universe of data as single points in multidimensional relation to a point representing the data of the particular user. The visualizer is scalable in range from the entire universe of data to data for users in a close neighborhood of the particular user's profile and characteristic data and allows expansion of a selected one of the single points for display of the profile and characteristic data of the user associated with the selected point.

27 Claims, 14 Drawing Sheets

FIG. 5b

METHOD AND APPARATUS FOR A COLLABORATIVE INTERACTION NETWORK

FIELD OF THE INVENTION

This invention relates generally to the field of software systems for providing common interest data to prompt user interaction and, more particularly, to a network data entry and presentation system employing user friendly input interaction and intuitive output presentation of common interest data and contact information.

BACKGROUND OF THE INVENTION

Databases and networks which collect and provide common interest information to users are an evolving phenomenon. Such systems have been present for a significant period of time, first as clubs and associations for individuals with like interests and later with the advent of computerized systems as databases for accumulation and presentation of information on persons with common experience and interest profiles. However, with the increase in capability of computers and database software, "social software" has emerged as an area of interest for both users and system developers.

Software implementation of interaction engines for groups associated with common companies or projects have been developed to increase the speed and efficiency of communications between members of the group. Such "groupware" is embodied in various commercially available systems such as Lotus Notes™. The impetus for these implementations has been to create increased coordination between members of a predefined group or organization. However, such systems do not typically emphasize or categorize individual traits or interests of members of the group.

Originating from the opposite end of the operational spectrum, dating or match making software has been developed to provide specifically targeted functional capability to identify individuals which may be compatible for romantic or social relationships. Typically these systems are highly limited in their capability to create inputs and categorize or present data in a broad context.

The capabilities of the internet and the common use of network interactions, through the internet or in dedicated systems, for acquiring and compiling data on individuals, their associations and interests and then making interaction data available to the individuals for initiating collaboration have now reached a new zenith. It is therefore desirable to provide a networking system that simplifies user profiling and presents accumulated profile data to the user in a manner which defines a basis for potential collaboration. It is further desirable that the data presentation to the user be flexible in the depth and focus to facilitate both a determination of basis for collaboration and information to effectively, efficiently initiate contact and foster individual and group interaction.

SUMMARY OF THE INVENTION

A collaborative network embodying the present invention provides screens for entering login data for a user and basic user profile data. After successful login, screens for receiving user characteristics data including text entry of user created data and proportional selection of data elements predetermined by the system are displayed. A calculation engine determines a universe of profile and characteristics data for all users based on similarity to the profile and characteristics data of a particular user and a visualizer displays a representation of the universe of data as single points in multidimensional relation to a point representing the data of the particular user. The visualizer is scalable in range from the entire universe of data to data for users in a close neighborhood of the particular user's profile and characteristic data. Interactive control allows selection of one of the single points for display of the profile and characteristic data of the user associated with that selected point.

BRIEF DESCRIPTION OF THE DRAWINGS

These and other features and advantages of the present invention will be better understood by reference to the following detailed description when considered in connection with the accompanying drawings wherein:

FIG. 5b is a screen shot of an alternative Sandbox data entry page;

DETAILED DESCRIPTION OF THE INVENTION

Figure 1A:
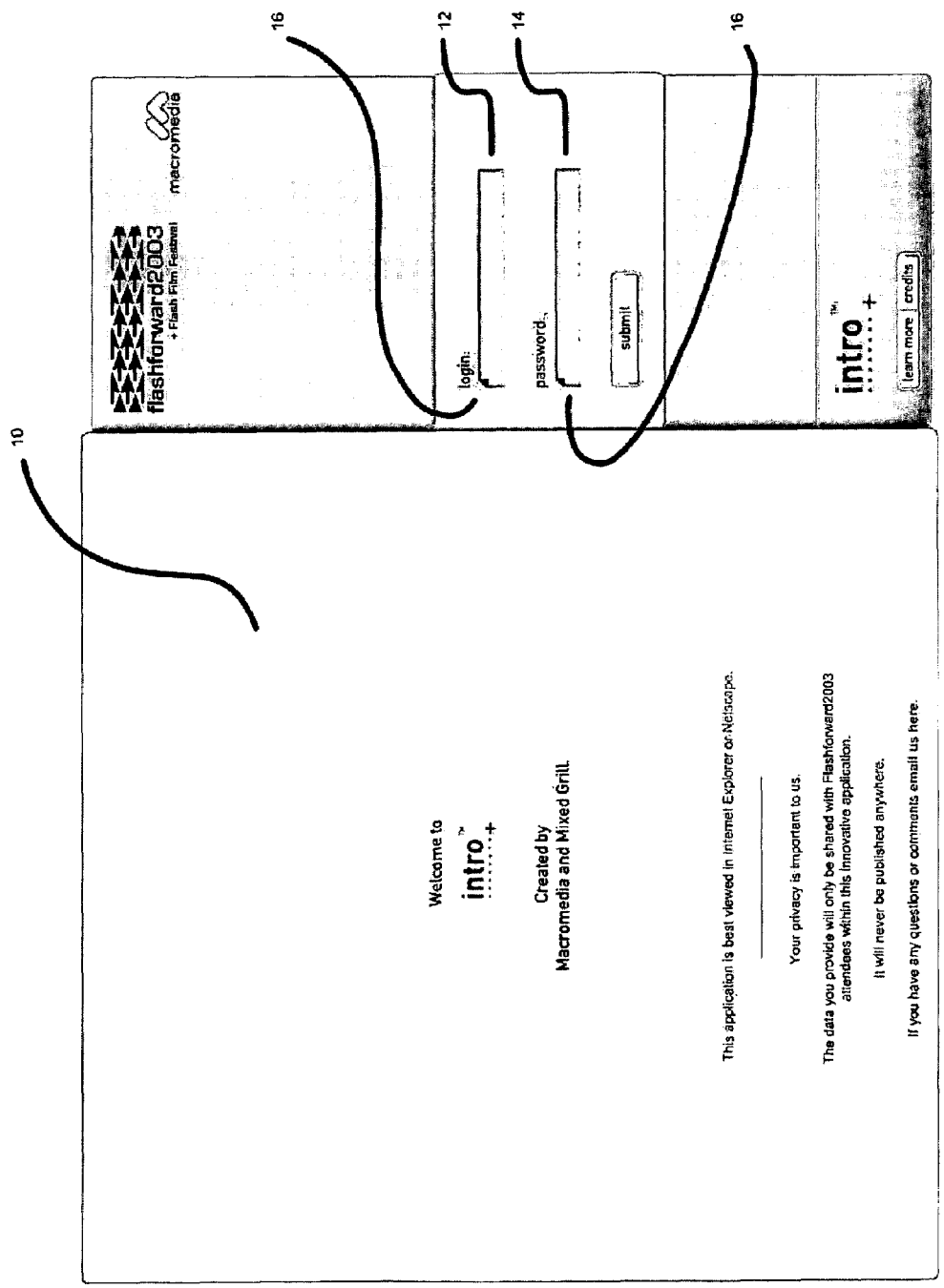
FIG. 1a is an exemplary screen shot of a login screen employed in a system embodying the present invention.
Figure 1B:
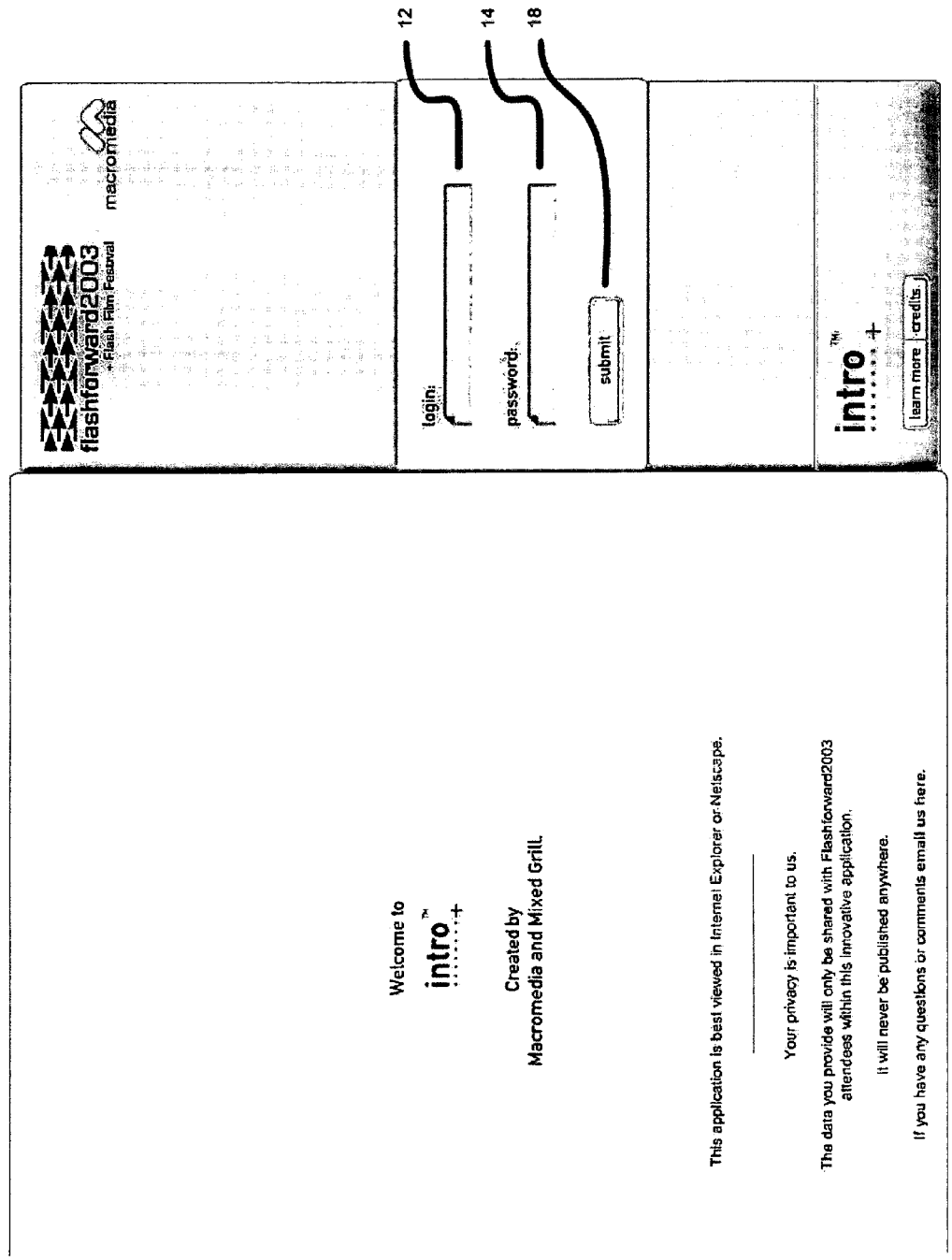
FIG. 1b is a second screen shot of the login screen with the data entered and verified for selection of the "submit" button.
Figure 2:
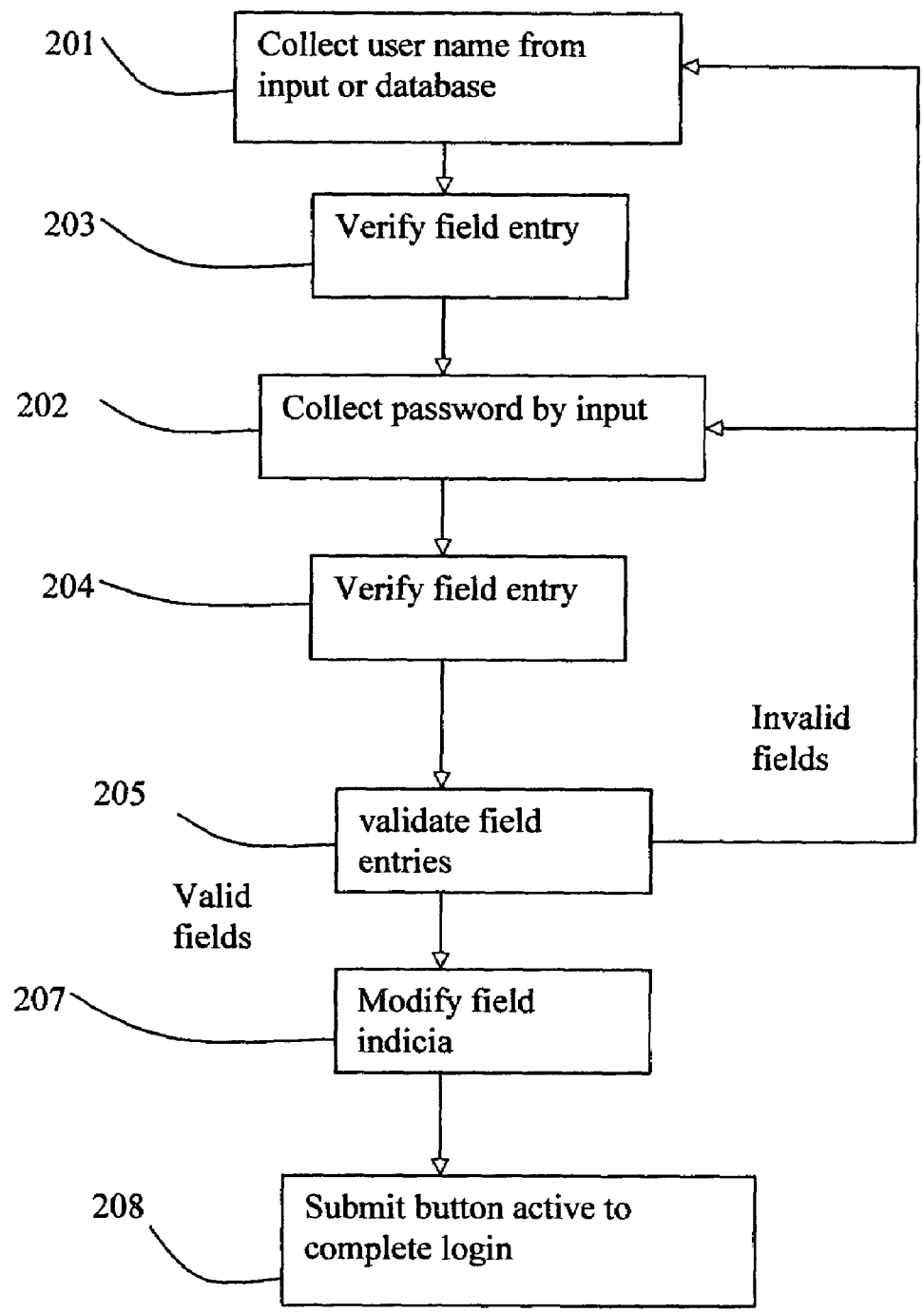
FIG. 2 is a flow chart of the login process.

An exemplary embodiment of the invention is incorporated in a system having three modules; a login module, a profiling module or Profiler and a presentation module or Visualizer. FIG. 1a shows a representative screen shot of the presentation screen 10 of the login module. FIG. 2 shows a flow chart of the system interaction associated with the login presentation screen. Using text entry boxes, the login module collects a person's username 12 in step 201 and password 14 in step 202 and then sends it to a server for verification steps 203 and 204 respectively. To simplify user interaction and feedback, since the module requires fields for this process, a required field displays a requirement indicia. In FIG. 1 this is demonstrated as a "turned down corner" triangle overlay 16 on the entry box, similar to forms that use an asterisk to denote a required field. However, in the present system, as the user enters information, the client software on the server automatically performs character validation, step 205. Once the server validates the field, step 206, the triangle turns color or is otherwise modified to demonstrate that the field has been validly completed. For example in one embodiment, a color change from red (required field) to green to indicate that the field is valid, step 207, indicating that the entered information is sufficient for login. As shown in FIG. 1b, when users fill in both fields, the Submit button 18 becomes active, step 208, so the user can click on it to complete the login.

In various embodiments, the login process can be a first time acceptance system, where any data fitting the character type required for validation of the field is accepted and becomes part of the database, or an invitation type system where the user will have previously been provided with a password based on some form of pre-registration, in which case both the user name and the password are validated by the system not only for character type but content.

Figure 3A:
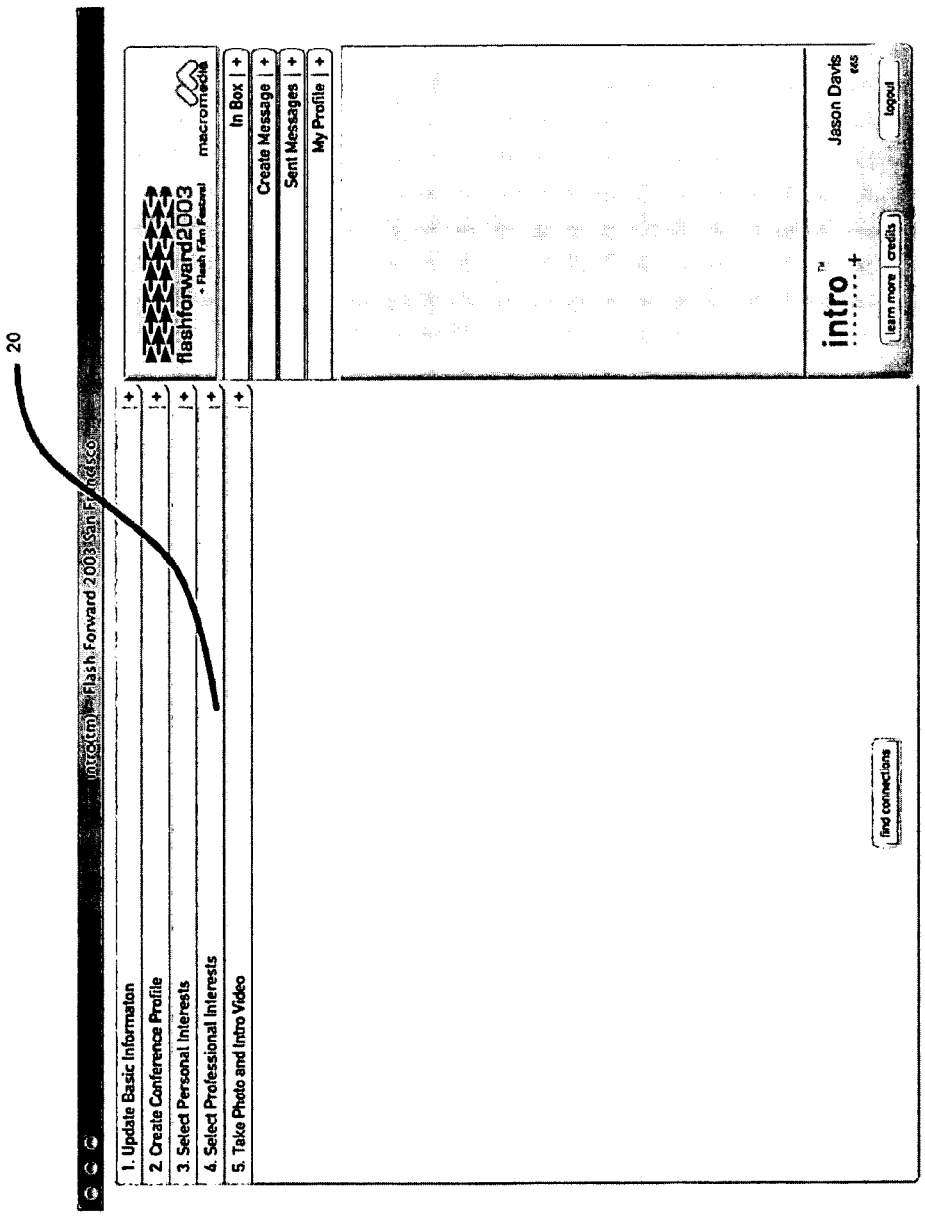
FIG. 3a is a screen shot of the accordion feature of the invention.
Figure 3B:
FIG. 3b is a screen shot of the first accordion entry page for user basic profile data entry.

For the embodiment shown, the system next collects information about users. It accomplishes this through a series of sequential pages for which title denominators are presented at the on the screen as an accordion 20 as shown in FIG. 3a. The accordion format not only helps separate each task but gives users a sense of how long it takes to enter their information and where they are in the process. As shown in FIG. 3b, the first screen 22, or accordion layer, is similar to the login page; it consists of text fields 24 that self-validate. Required fields which do not yet contain data are denoted with the requirement indicia as previously described with respect to the login module.

As previously described with respect to the login module, for applications in which data has been gathered on the user in a pre-registration context or through other means, a preexisting database is used to initialize data for the system. In the case of a database driving the application, there is already information available to the client application about the user. This means that some user data is already filled in and users mainly verify its accuracy. If the data is incorrect, the user replaces the data in the text box.

Figure 4:
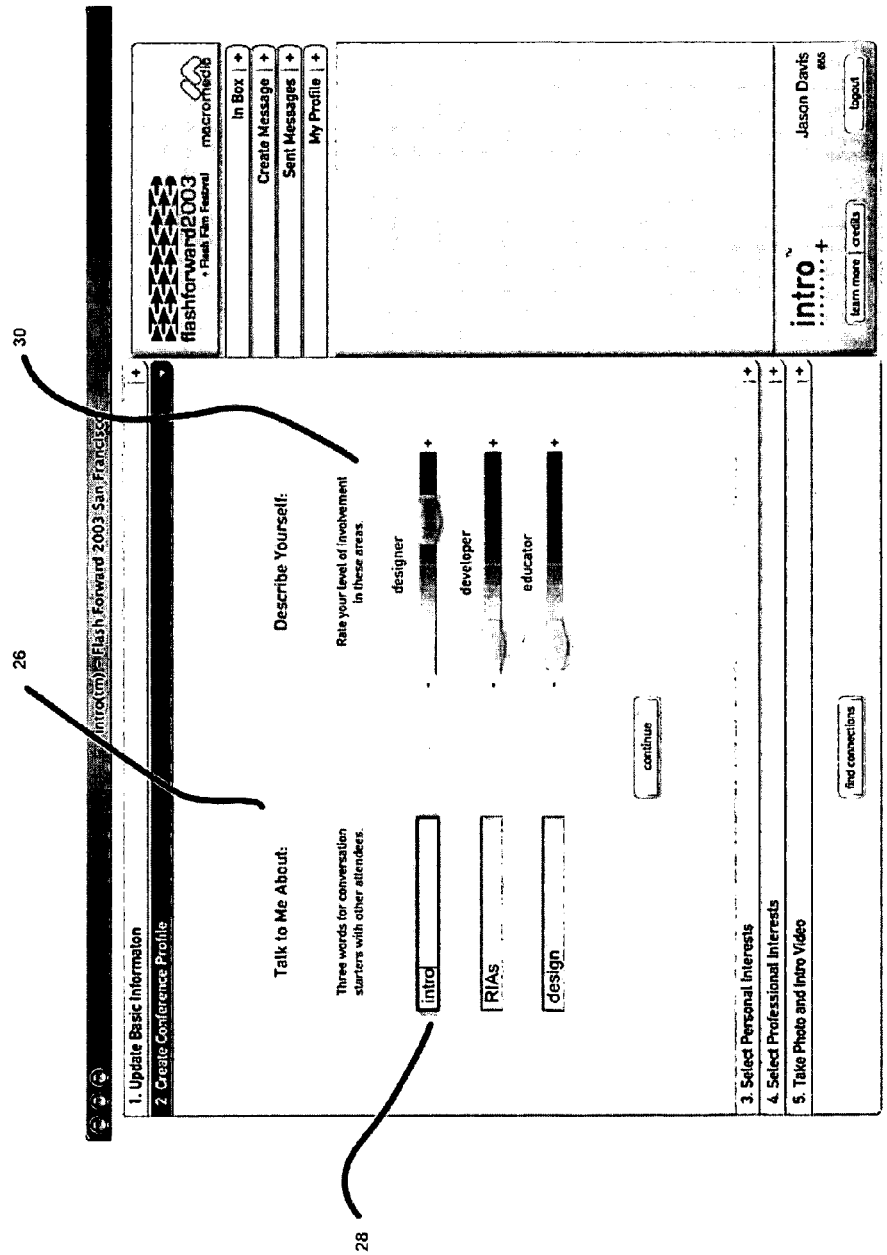
FIG. 4 is a screen shot of the second accordion entry page for user selected input and slider rating of preselected terms.

For the embodiment shown in the drawings, a conference registration has provided the basis for the data entry and initial aspects of the intended collaboration. The second accordion layer 26, denominated "Create Conference Profile", when activated by clicking on the accordion header shows data entry fields of a first type for user generated data, the Talk to Me About fields 28 as shown in FIG. 4. These fields provide input boxes for users to enter words or phrases for their Intro Card described in greater detail subsequently. These data elements are high level descriptions which are independently created by the user. For the example shown these are simply conversation starters or ways for people to learn more about each other on a generalized basis. In some cases, these Talk to Me About phrases and words can be output by the system in alternate formats such as on attendees' badges for use while at the conference.

Also appearing on the second screen in the exemplary embodiment are a second data entry form designated affinity sliders 30 for system generated specific descriptors. Users move the slider with the mouse cursor to match their affinity to the word 32 appearing next to the slider. The word defined by the system is based on a predetermined criterion. In the example shown in the embodiment, the conference attendees are anticipated to have certain professional or personal characteristics based on their decision to attend the conference. The slider position selected indicates the proportional accuracy or applicability of the descriptor to him or herself as determined by the using attendee. The comparisons between the slider positions and those of a candidate for collaboration or contact which the user selects on the system, as will be described in greater detail subsequently, appear when the user clicks the Compare Me button on the Intro Card.

Alternate forms of input for terms such as selection from drop down boxes can be applied to system generated specific descriptors. These data input forms do not provide the proportional description flexibility of the affinity sliders, but may provide more definitive input for profile comparisons in certain applications.

Figure 5A:
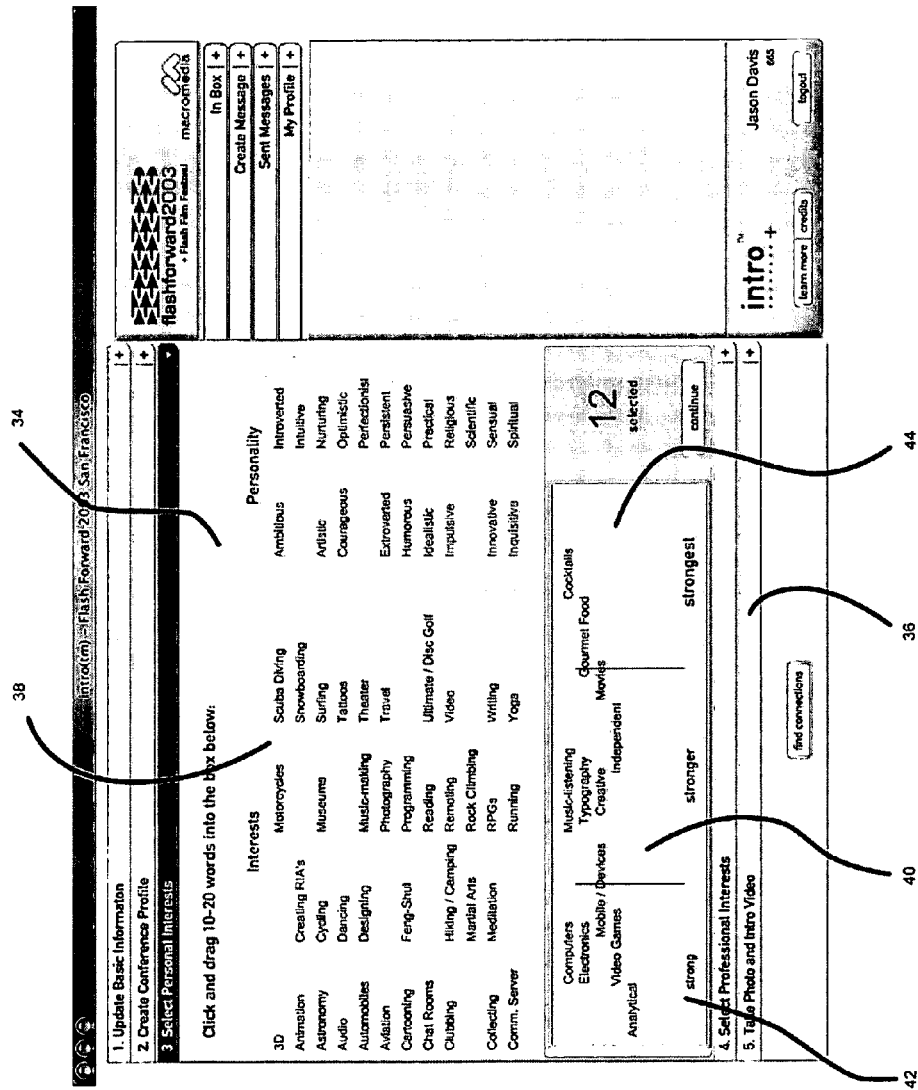
FIG. 5a is a screen shot of a first example of the accordion entry pages for Sandbox data.

The third and fourth accordion layers, 34 and 36, of FIG. 3a provide a third data entry form called the Sandbox for mixed proportional designation of multiple predetermined characteristic terms. For the embodiment shown in the drawings, the third accordion layer shown in FIG. 5a provides input for characterization of professional interests while the fourth layer provides input for characterization of personal interests. For the embodiment shown in the drawings the fourth layer is substantially identical in appearance and function. For the example in the drawings, 168 attributes 38 are provided by the system from which users select words that describe their personal and professional interests. An element of proportionality is added to the attribute by the user employing the mouse to drag the word selected with the cursor into an applicability bin 40 which describes levels of applicability to the user of the term.

In the example shown, the professional interests of conference attendees may include "managing", "marketing", "technical", and "business development". A registering attendee may be involved in managing and technical but not in marketing or business development. The attendee may spend the vast majority of his/her time "managing" and a modicum of time in "technical" pursuits so he/she selects those two terms and places them respectively in the "strongest" and "strong" portions 42 and 44 of the applicability bin. An interesting feature of the sandbox is it allows the user to create the proportionality based on their perceptions or on empirical data. In the prior example, the attendee may value his technical expertise more than his management capability and therefore place them in reversed positions in the applicability bin. Data within each bin is stored for calculations with a relational value of 0-9. This relational value is used as an influence factor on the visualization for position as described subsequently.

Figure 5B:
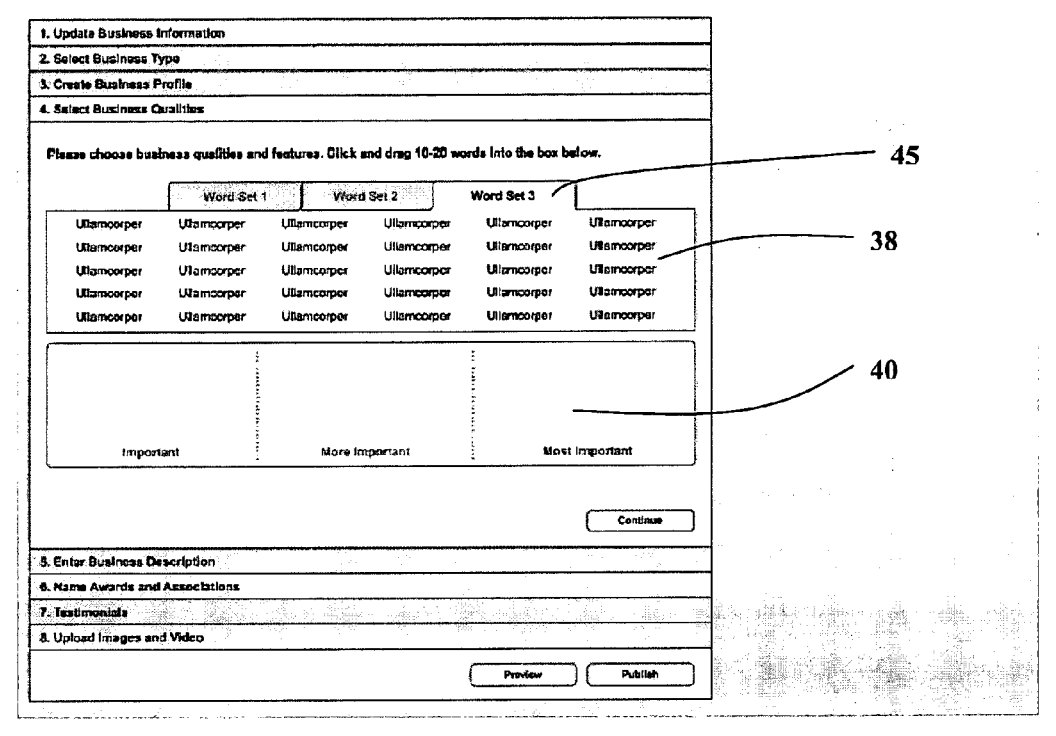

In alternative embodiments, more than two categories of data are entered using the Sandbox format as shown in FIG. 5b where tabs 45 are provided to categorize the attributes. Selection of a tab provides a series of attributes which can then be "dragged" into the bin 40.

Another feature, which has appeared in certain past versions of the software, is called Table Partners. Located in one of the screens of the Profiler section of the software, this feature allows users to select a specific meal time and location from a set list of options. Then using the data in the Profiling section of the application, users are matched up at tables for meals. For example, the software can seat six individuals at the same table who matched on a predetermined number of characteristics in the Sandbox.

Figure 6:
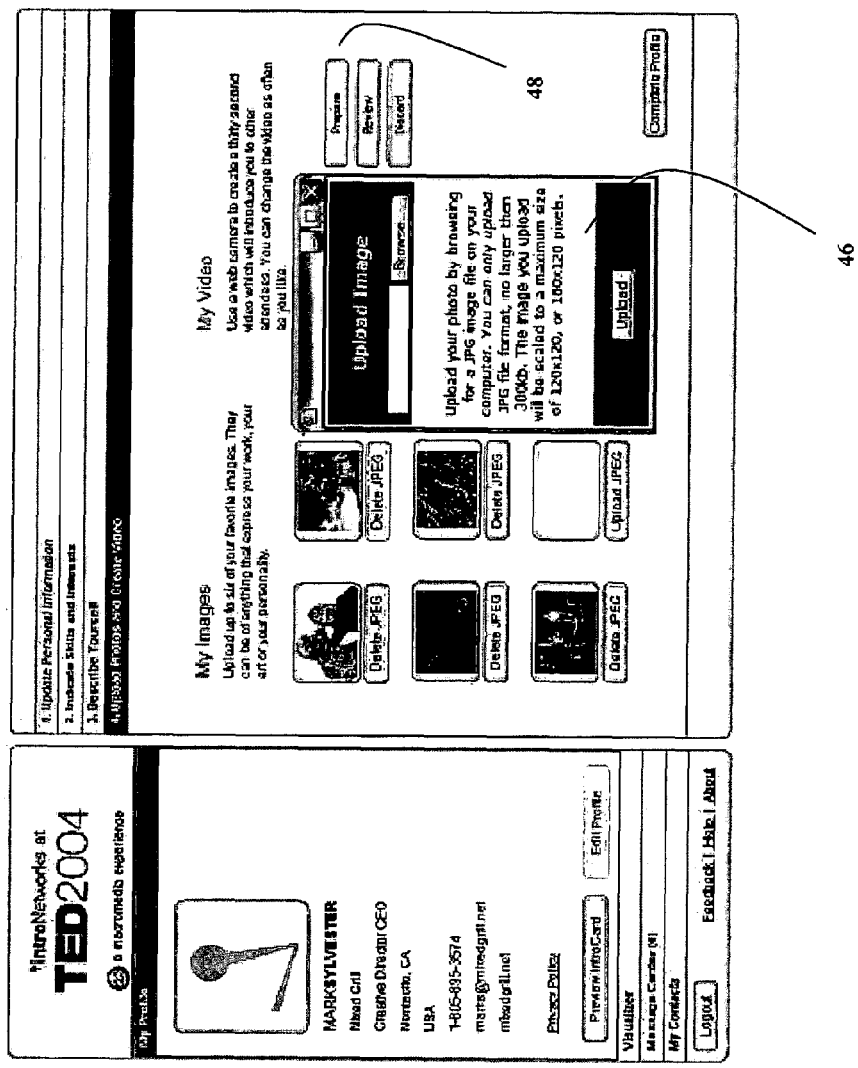
FIG. 6 is a screen shot of the accordion entry page for uploaded data.

The fifth screen as shown in FIG. 6 provides for uploaded or alternative format data such as photographs or videos. This allows users to upload a photo, or snap a photo or record video using a web cam in real time for entry into the system. Simple controls for file name input through text box 46 for uploading of data or the "capture video" controls 48 to activate a web cam mounted on the input station monitor. While the upload data for the embodiment shown is photographs or video, alternative embodiments employ file uploads for business or marketing data or other comparable materials specific to the user.

For the embodiment disclosed herein, as users complete the data in each page, the system collects it and sends it to the server. In order to send the data, the application converts it into parameters of a server query. This task is simplified by creating a parameter manager that loops through the available data and packages it into an object such as that shown in Table 1.

TABLE 1

```
var page1params_array = new Array("firstName", "lastName",
    "company", "title", "city", "state", "country", "email", "website",
    "password");
var page1params_obj = new Object( );
var param;
for (var i = 0; i < page1params_array.length; i++) {
    param = page1params[i];
    page1params_obj[param] = this[param + "_txt"].text;
}
```

Now a single object is available that contains all the data being sent to the server. The embodiment described herein uses Flash Remoting and the object itself is sent to the server as the parameter argument. In other embodiments an actual query string is created, similar to a GET method, and can be implemented in a software routine as disclosed in Table 2.

TABLE 2

```
var params = " ";
for (var n in page1params_obj) {
    params += n + "=" + page1params_obj[n] + "&";
}
```

This results in a string like "firstName=Beau&lastName=Ambur . . . " that can then be appended to a server query as a group of parameters.

Figure 7:
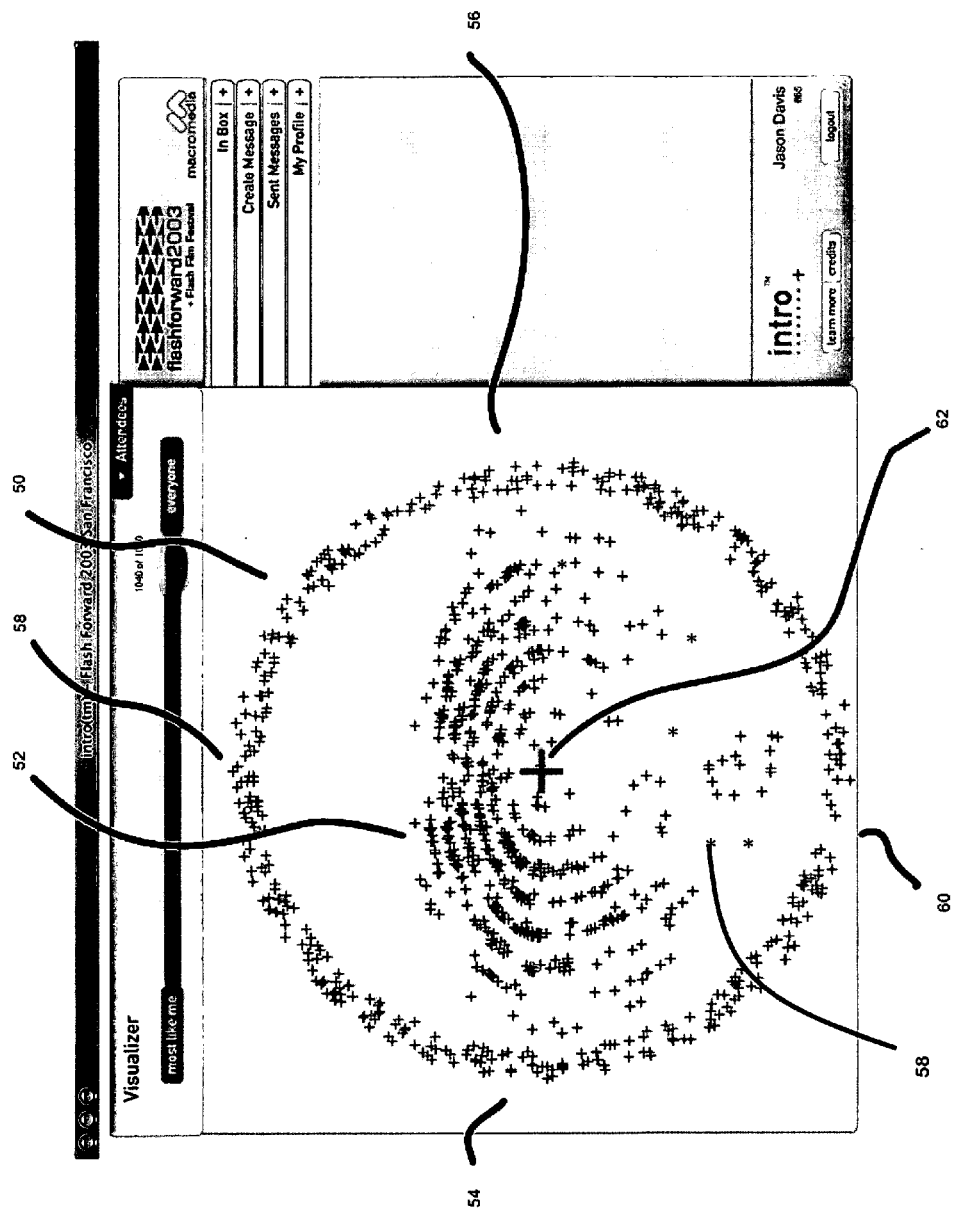
FIG. 7 is a screen shot of the visualizer.

The third module of the system is the presentation module or Visualizer. For the embodiment described herein, the Visualizer is a single view 50 that shows all users in the database in one screen as shown in FIG. 7. The Visualizer represents each entity in the database (for the described embodiment, a person) as an icon such as a plus sign (+) or a graphical pin icon. 52. Because there can be well over 1,000 people at one time, it is very important to keep the data as light as possible to reduce the amount of bandwidth required to generate this view and to keep processing time to a minimum. This is accomplished by utilizing graphical icons that are very simple in shape and color and are Vector file types. Vector graphics are easily scalable so that they can be quickly redrawn on zoom. FIG. 7 shows a radial graph of relational data. A universe of profile and characteristic data is calculated relative to the client user's profile and characteristics. The server employed in the system calculates all possible variables available for each user and returns two values, a radial location and distance, about each person to the client user.

Exemplary code for accomplishing this calculation of variables for a comparable three attribute system is shown in Table 3.

TABLE 3

```
var cats = ["p", "i", "a"];
if (_mc.a == _mc.p == _mc.i) {
    matched = cats[random(3)]
} else if (_mc.a == _mc.p) {
    if (random(1) == 0) {
        matched = "a";
    } else {
        matched = "p";
    }
} else if (_mc.a == _mc.i) {
    if (random(1) == 0) {
        matched = "a";
    } else {
        matched = "i";
    }
```

TABLE 3-continued

```
} else if (_mc.i == _mc.p) {
    if (random(1) == 0) {
        matched = "i";
    } else {
        matched = "p";
    }
} else if (_mc.a > _mc.p && _mc.a > _mc.i) {
    matched = "a";
} else if (_mc.p > _mc.a && _mc.p > _mc.i) {
    matched = "p";
} else {
    matched = "i";
}
// Set Color and Radial based on category association
if (matched == "a") {
    trace("P");
    d_color = Env.getValue("WORDBOX0_COLOR");
    deg = ((Math.random( )*120)-150-60)*Math.PI/180;
} else if (matched == "i") {
    trace("I");
    d_color = Env.getValue("WORDBOX1_COLOR");
    deg = ((Math.random( )*120)-30-60)*Math.PI/180;
} else {
    trace("A");
    d_color = Env.getValue("WORDBOX2_COLOR");
    deg = ((Math.random( )*120)+90-60)*Math.PI/180;
}
// Calculate distance
dist = Math.max(10, (1-matches/topMatch) * 230 + (Math.random( )*30));
```

Information consisting of a personal, career and an interest match rating are collected using code as provided in Table 3, which combine for a total possible match of 100 percent. All people in the database are then visually arranged according to these values. Anyone who matches the user viewing the data with more career matches falls towards the left ⅓ 54 of the Visualizer, while a interest match falls towards the right ⅓ 56 of the Visualizer. If the user has a mutual number of career and personal interests, then people who match them both will fall in between the two categories and similarly for the other categories for which data is collected. Most important, of course, is where people appear in relation to the middle of the screen center 62 (similar to a bulls eye) which represents the user. The closer to the center they are, the more they match in all areas.

As previously discussed, the distance definition is further calculated in certain embodiments using the influence factor established based on the relational value of the sandbox data.

As demonstrated in the embodiments described, the invention allows for the categories to be manipulated to meet specific application needs. For example in one use setting for a conference, the categories employed may be career, interest and personal attributes while in another business setting, only skills and personal attributes are employed. The number and description of categories and terms employed within the categories are flexible for each particular application. The Visualizer is segmented according to the number of categories defined. Additionally, the data depiction icons in the Visualizer are modified in various embodiments to provide indicia of additional available data for the user represented by the icon. For example if a photo has been uploaded as previously described with respect to FIG. 6, the icon on the Visualizer is depicted in a different color or with a different icon shape as shown for one representative asterisk 58. Alternatively, the color or shape can be a further indicia of the relative similarities of the user and the people or entities represented in the visualizer. For example, greater similarity in the career category could result in an icon of a first color while similarity in the personal category would result in an icon of a second color.

Figure 8:
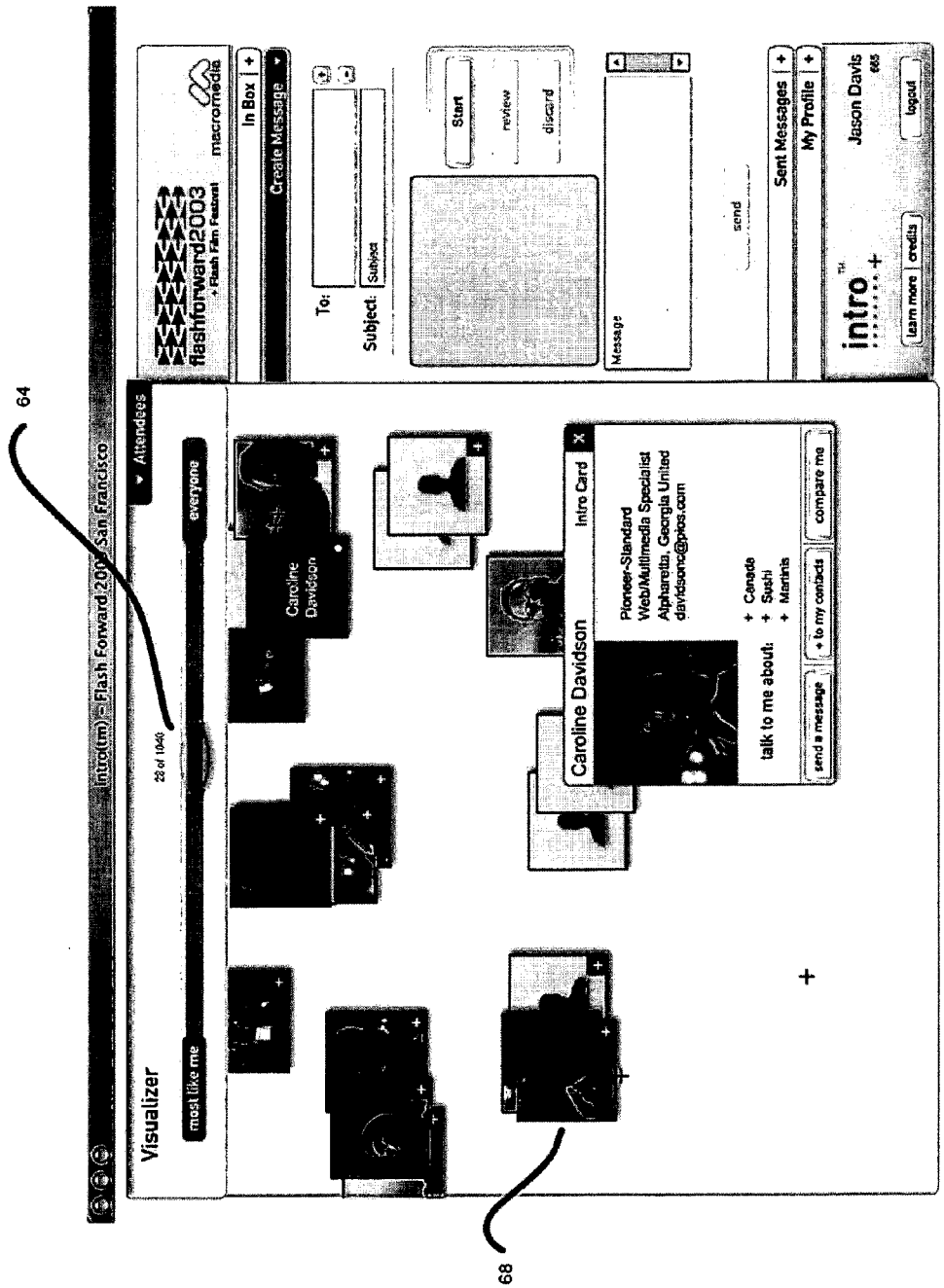
FIG. 8 is a screen shot of the visualizer in zoom.
Figure 9:
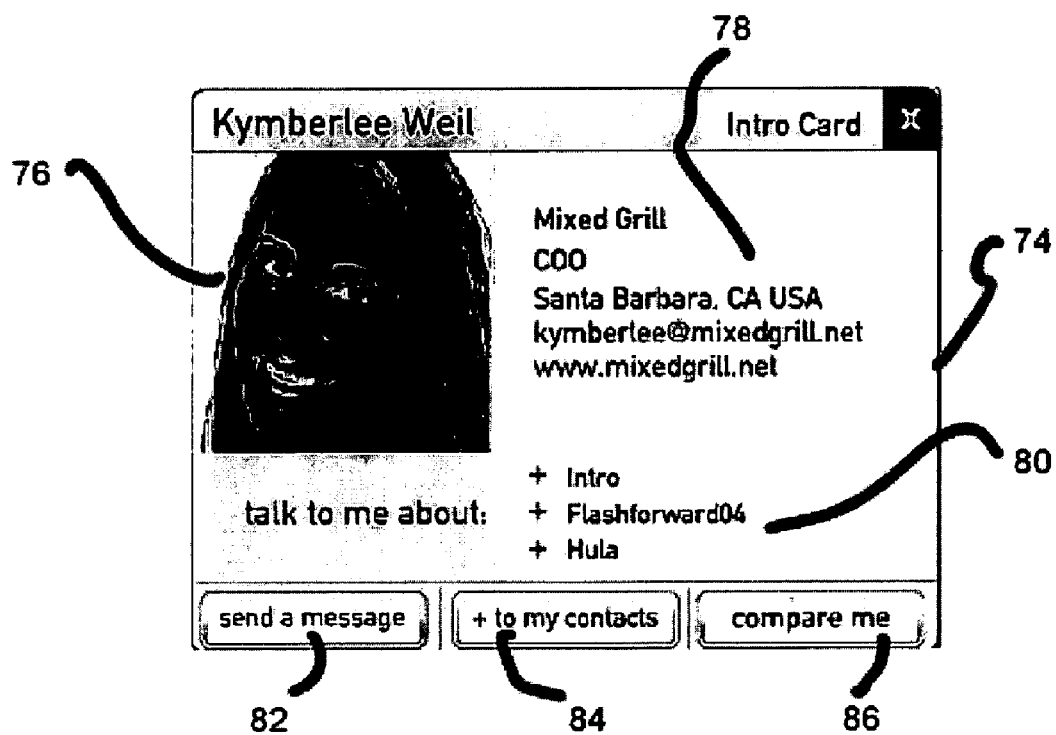
FIG. 9 is a screen shot of the Intro Card.

FIG. 8 demonstrates what happens when the user zooms into the view presented in FIG. 7. As the level of zoom 64 is varied, the view changes to more specifically identify the people designated in the Visualizer. At an appropriate zoom to accommodate visual definition, in some examples of the software, pictures 68 of the other users (entered as uploaded data described with respect to FIG. 6 above) appear to identify more easily who is who. Clicking a person opens their Intro Card 74 shown in FIG. 9, which provides a display of summary information regarding that user. For the embodiment shown, this information includes the photograph 76 entered on accordion screen 5, basic contact information 78 from accordion screen 1 and Talk to Me About words 80 entered on accordion screen 2.

From the presentation of the Intro Card by the system, communication can be established with a potential collaborator on the system by sending a message containing text and video by clicking the Send a Message button 82. This opens a communication component of the application for the user to send and read video and text messages. In certain embodiments, the message includes a copy of the user's Intro Card for introduction to the receiving party. The user can add anyone to their contact list by clicking the middle button 84 or find out more about them by clicking the Compare Me button 86.

For certain embodiments of the system, upon rollover of one of the graphic icons in the Visualizer, the individual's name appears. If the user hovers over the icon with the mouse, a photo of the individual appears in addition to the individual's name.

Figure 10:
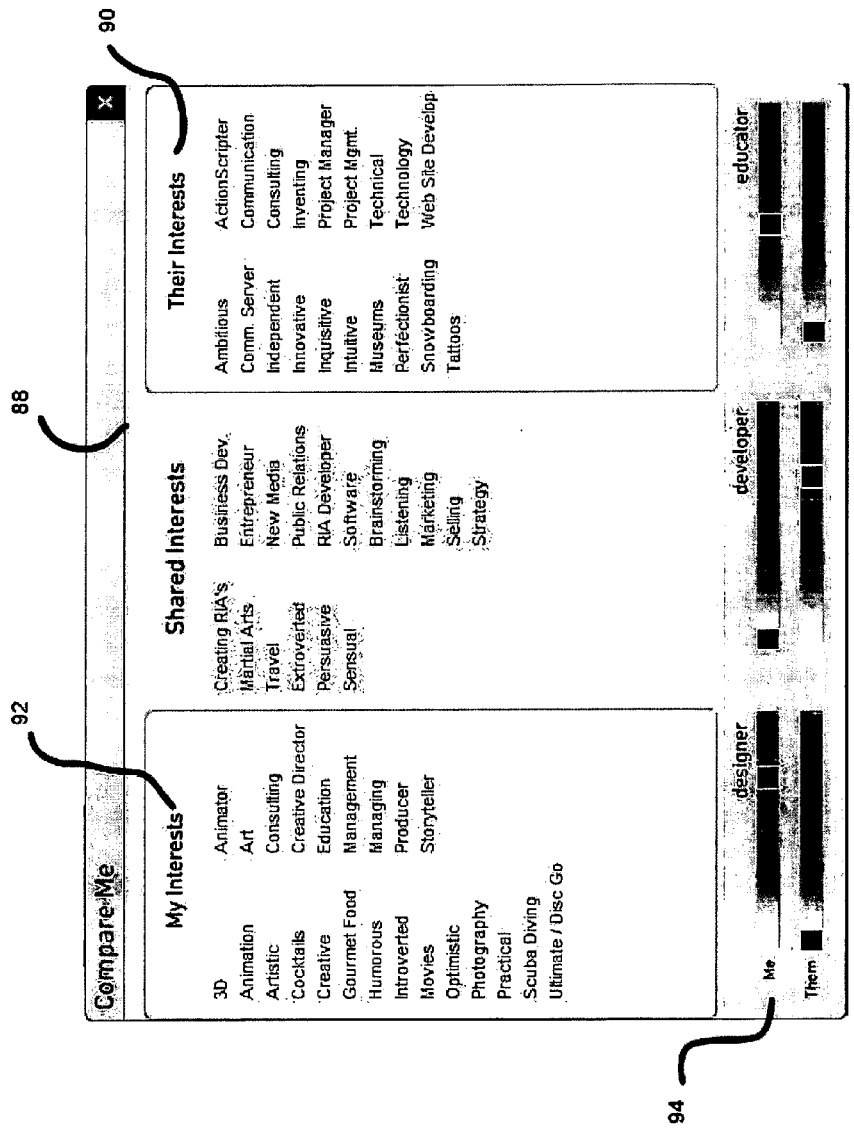
FIG. 10 is a screen shot of the Compare Me screen.

Clicking the Compare Me button opens a Compare Me page showing a detailed list of interests as shown in FIG. 10. For the embodiment shown in the drawing, a middle column 88 shows common interests between the user and the potential collaborator with a listing of the characteristic terms from the sandbox. The right and left columns, 90 and 92, show the listed attributes of each party which are not common. At the bottom of the comparisons are the relative affinity sliders 94 for the user and compared party. The middle column shows all attributes which both parties have in common. In a different version of the software, the user can view one panel on the Intro Card which shows all of the selected person's chosen interests and those that match the user are depicted in a color.

Figure 11:
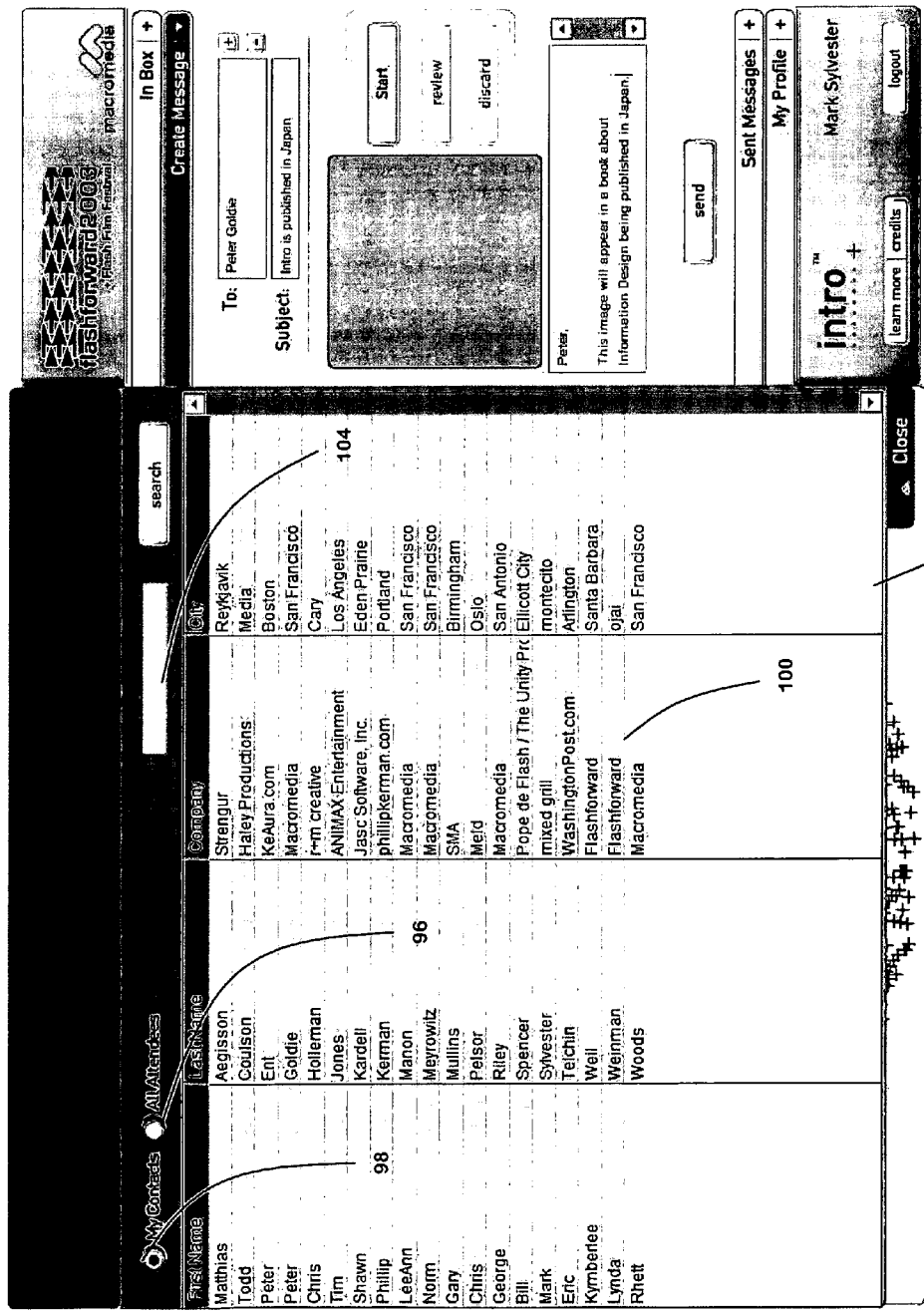
FIG. 11 is a screen shot of an exemplary embodiment of the search screen.

For the embodiment described, the system provides a search capability for all terms present in the system. FIG. 11 shows an exemplary format for the search screen with selection capability between all attendees and my contacts (previously created using the add to contacts function on the Intro card) using buttons 96 and 98 respectively. Terms 100 relevant to the category selection are displayed in the window 102 for searching by clicking on the word for selection and entry boxes 104 are provided for searching based on text entry. Search can occur on any word stored in the database which is gathered when the user fills out the profile Screens. For example, an individual can search on city or company of job title—if it is collected in the Profiler, it can be search on.

The embodiment described herein is directed to an introduction system for conference attendees. The invention in alternative embodiments is applicable to business collaboration networks, internal corporate communications systems, public or non-profit entity affiliation networks and traditional social software networks such as professional associations and dating websites.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A collaborative interaction network system comprising:
   means for entering login data for a user;
   means for inputting basic user profile data elements;
   means for receiving user characteristics data including
   means for text entry of user created data elements;
   means for selection of predetermined data elements with assignment of proportional value including a sandbox for receiving a plurality of attributes selectable by the user;
   means for calculating a universe of profile and characteristics data for all users based on similarity to the profile and characteristics data of a particular user;
   means for displaying a representation of the universe of data as single points in multidimensional relation to a center point representing the data of the particular user, the displaying means scalable in range from the entire universe of data to data for users in a close neighborhood of the particular user's profile and characteristic data; and
   means for expansion of a selected one of the single points for display of the profile and characteristic data of the user associated with the selected one single point.

2. The collaborative interaction network system as defined in claim 1, wherein the means for selection of predetermined data elements with assignment of proportional value further comprises a slider associated with a predetermined term, the slider adjustable through a range of applicability of the predetermined term to the user.

3. The collaborative interaction network system as defined in claim 1 wherein the sandbox further comprises a plurality of proportionality bins in which the selected attributes are placed based on relative applicability to the user.

4. The collaborative interaction network system as defined in claim 1 wherein the expansion means further comprises:
   means for displaying a specific comparison of the particular users profile and characteristic data and the profile and characteristic data of the user associated with the selected one single point.

5. The collaborative interaction network system as defined in claim 1 wherein the expansion means further comprises:
   means for initiating contact with the user associated with the selected one single point.

6. The collaborative interaction network system as defined in claim 1 wherein the expansion means further comprises:
   means for storing the profile information of the user associated with the selected one single point in a database specific to the particular user.

7. The collaborative interaction network system as defined in claim 1 wherein the single points on the displaying means further include secondary indicia of available data included for the user associated with the selected one single point.

8. The collaborative interaction network system as defined in claim 7 wherein the secondary indicia comprises a variable icon representing the single points.

9. The collaborative interaction network system as defined in claim 7 wherein the secondary indicia comprises a variable color applied to an icon representing a single point.

10. The collaborative interaction network system as defined in claim 1 wherein the multidimensional relation is radial location and distance, and the calculating means calculates a segment and distance for each point representing the data for a particular user.

11. The collaborative interaction network system as defined in claim 1 wherein the proportional selection means further includes a plurality of selectable categories of attributes, the attributes in each category further selectable by the user for placement in the sandbox with placement of the attribute geometrically in the sandbox providing two dimensional proportionality.

12. The collaborative interaction network system as defined in claim 1 wherein the means for receiving user characteristic data further includes means for accepting uploaded files.

13. The collaborative interaction network system as defined in claim 1 further comprising means for searching the universe of profile and characteristics data based on a selected one of the user created data elements, profile data elements or predetermined data elements.

14. A method for collaborative interaction on a computer implemented network comprising the steps of:
    receiving login data entered by a user on a screen;
    receiving basic user profile data elements on the screen;
    receiving user characteristics data including
        text entry of user created data elements through a keyboard and
        selection of predetermined data elements through a screen input with assignment of proportional value including a sandbox for receiving a plurality of attributes selectable by the user;
    calculating in a calculation engine a universe of profile and characteristics data for all users based on similarity to the profile and characteristics data of a particular user;
    displaying a representation of the universe of data on the screen as single points in multidimensional relation to a point representing the data of the particular user, the display scalable in range from the entire universe of data to data for users in a close neighborhood of the particular user's profile and characteristic data; and,
    expanding on the monitor screen a selected one of the single points for display of the profile and characteristic data of the user associated with the selected one single point.

15. The method for collaborative interaction on a network as defined in claim 14 wherein the selection of predetermined data elements with assignment of proportional value includes the step of providing a slider on the monitor screen associated with a predetermined term, the slider adjustable through a range of applicability of the predetermined term to the user.

16. The method for collaborative interaction on a network as defined in claim 14 wherein the step of expanding further includes the step of displaying an introductory card with representative data of the user.

17. The method for collaborative interaction on a network as defined in claim 14 wherein the step of providing a plurality of attributes selectable by the user for placement in a sandbox includes providing a plurality of proportionality bins on the monitor screen in which the selected attributes are placed by the user based on relative applicability to the user.

18. The method for collaborative interaction on a network as defined in claim 14 wherein the step of expanding further includes the step of displaying on the monitor screen a specific comparison of the particular users profile and characteristic data and the profile and characteristic data of the user associated with the selected one single point.

19. The method for collaborative interaction on a network as defined in claim 14 wherein the step of expanding further includes the step of initiating contact with the user associated with the selected one single point.

20. The method for collaborative interaction on a network as defined in claim 14 wherein the step of expanding further includes the step of storing the profile information of the user associated with the selected one single point in a database specific to the particular user.

21. The method for collaborative interaction on a network as defined in claim 14 wherein the step of displaying further includes displaying secondary indicia on the single points representative of available data included for the user associated with the selected one single point.

22. The method for collaborative interaction on a network as defined in claim 21 wherein the secondary indicia comprises a variable icon representing the single points.

23. The method for collaborative interaction on a network as defined in claim 21 wherein the secondary indicia comprises a variable color applied to an icon representing a single point.

24. The method for collaborative interaction on a network as defined in claim 14 wherein the multidimensional relation is a radial location and distance and the calculating step calculates a segment and distance for each point representing the data for a particular user.

25. The method for collaborative interaction on a network as defined in claim 14 wherein the proportional selection further includes a plurality of selectable categories of attributes, the attributes in each category further selectable by the user for placement in the sandbox with two dimensional proportionality by geometric placement on the monitor screen of the attribute in the sandbox.

26. The method for collaborative interaction on a network as defined in claim 14 wherein the step of receiving user characteristic data further includes accepting uploaded files from a database.

27. The method for collaborative interaction on a network as defined in claim 14 further including the step of searching the universe of profile and characteristics data based on a selected one of the user created data elements, profile data elements or predetermined data elements.

* * * * *